United States Patent [19]

Bilak

[11] 4,327,667
[45] May 4, 1982

[54] CAT TOILET ASSEMBLY

[76] Inventor: Richard C. Bilak, 1016 Delaware Ave., Glassport, Pa. 15045

[21] Appl. No.: 206,060

[22] Filed: Nov. 12, 1980

[51] Int. Cl.³ ............................................. A01K 29/00
[52] U.S. Cl. ........................................ 119/1; 209/352
[58] Field of Search ....................... 119/1, 19; 209/352

[56] References Cited

U.S. PATENT DOCUMENTS

| | | | |
|---|---|---|---|
| 1,421,809 | 7/1922 | Mischke | 209/352 |
| 1,629,149 | 5/1927 | Citrin | 209/352 |
| 2,612,896 | 10/1952 | Fox | 209/352 |
| 3,100,474 | 8/1963 | Schneider | 119/1 |
| 3,482,546 | 12/1969 | Anderson | 119/1 |
| 4,120,264 | 10/1978 | Carter | 119/1 |

Primary Examiner—Jay N. Eskovitz
Attorney, Agent, or Firm—Paul Bogdon

[57] ABSTRACT

A cat toilet assembly is disclosed. The assembly includes a box-like hollow enclosure having upstanding interconnected sides, one of which has a discharge passageway therethrough. The top of the enclosure is open and is normally closed by a selectively operable hinged trap door arranged below the top edge of the enclosure. Cat litter is received on the trap door which may be opened when it is desired to separate excrement from the cat litter. A screen member is disposed at a downwardly directed angle beneath the trap door. The lower edge of the screen communicates with the discharge passageway through the one side of the enclosure. A tray or the like is arranged below the screen to catch cleaned litter passing therethrough. A container or bag is arranged outside the passageway to receive excrement which will move along the screen and out of the enclosure because of the screen's incline.

5 Claims, 4 Drawing Figures

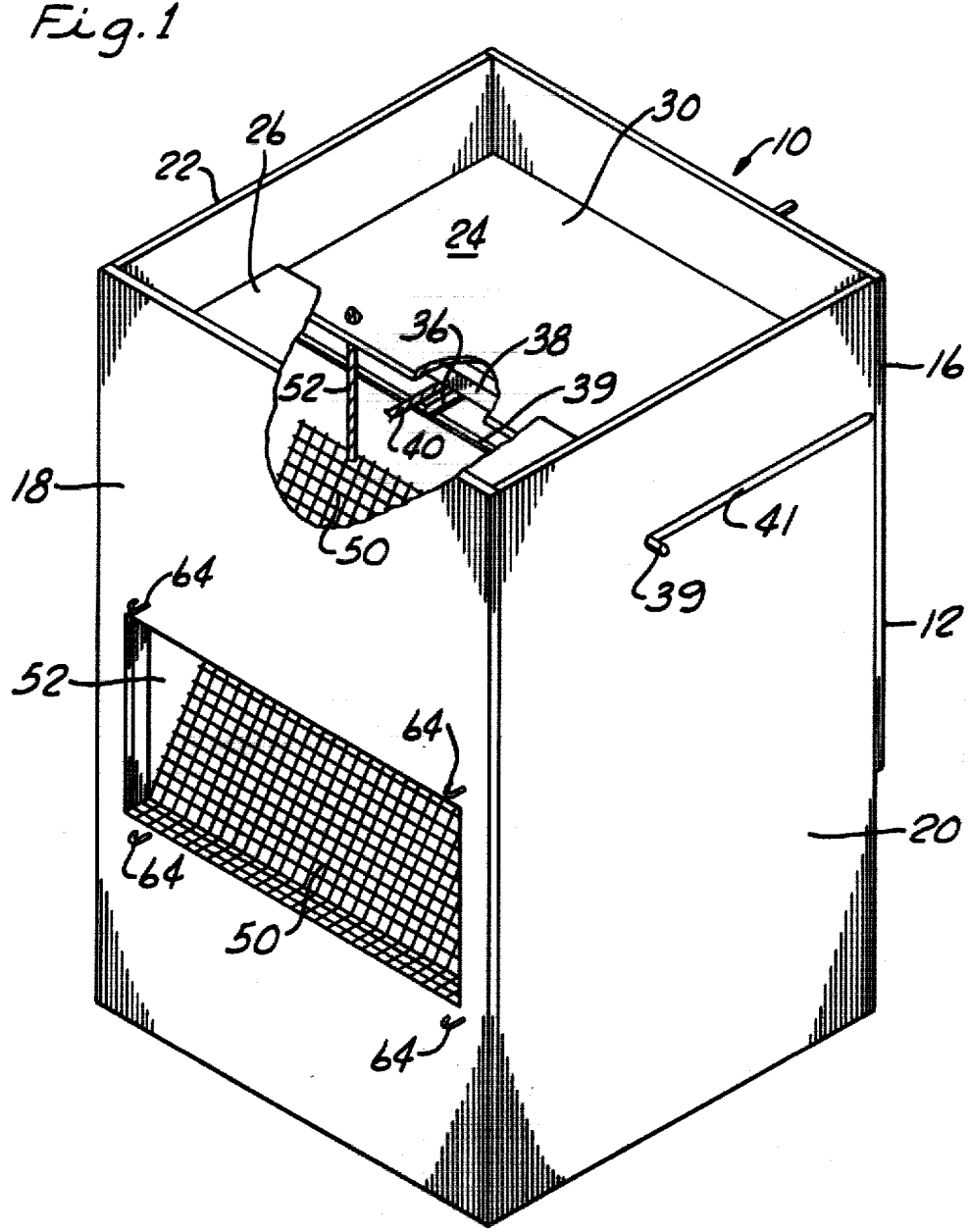

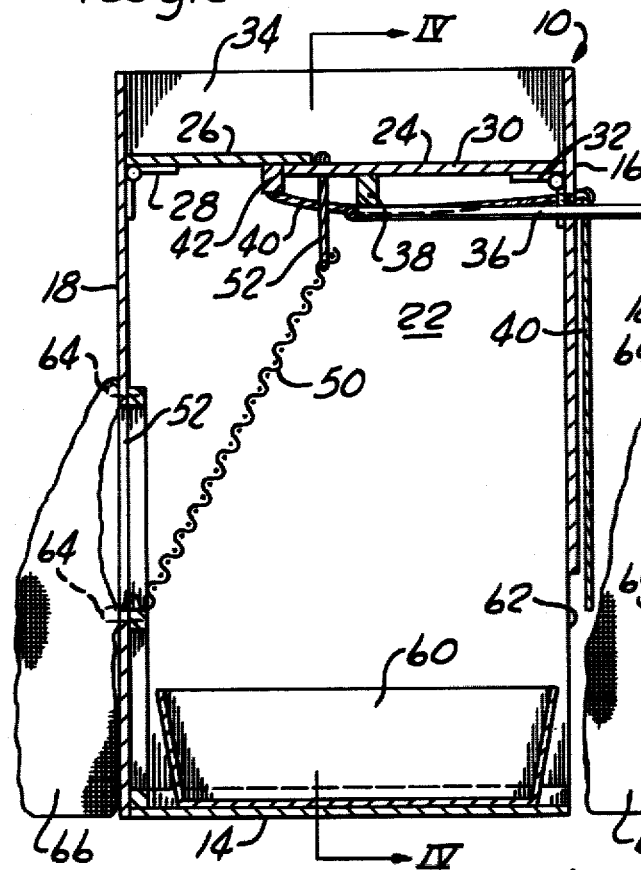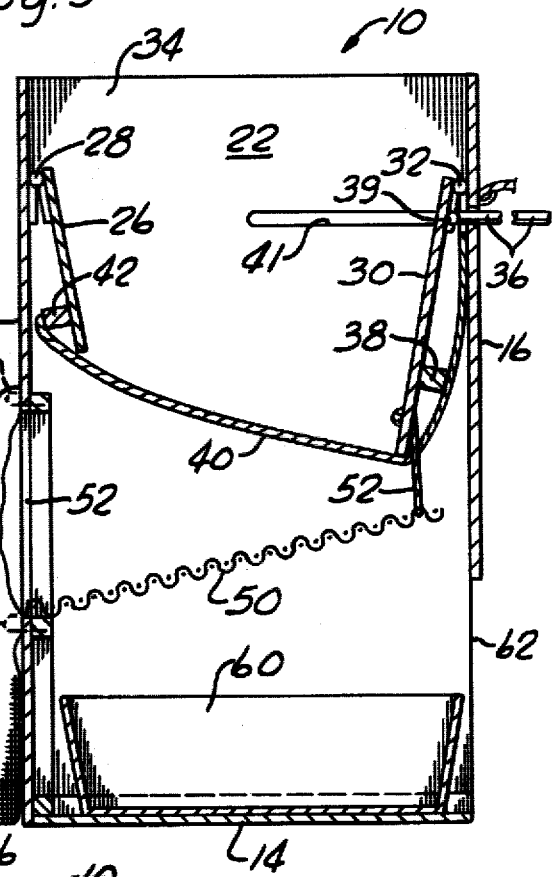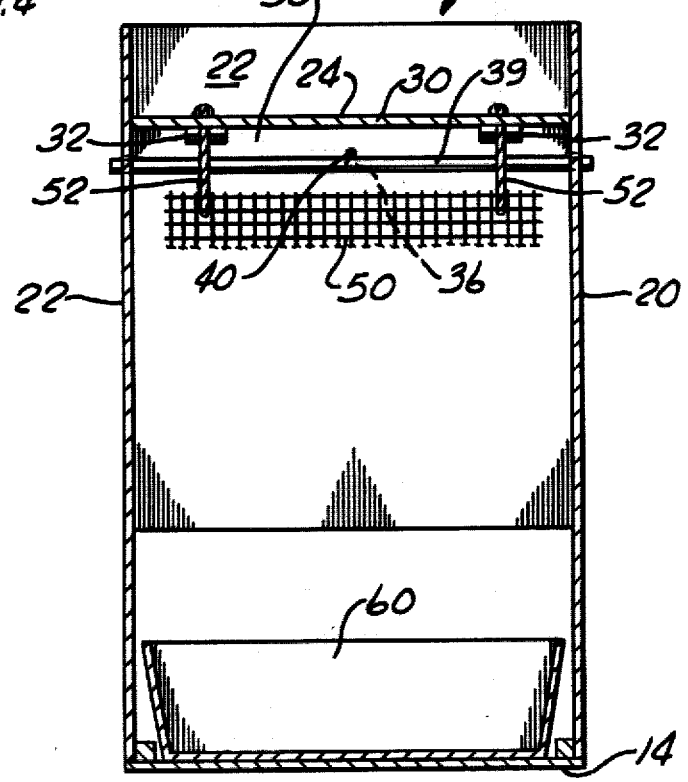

CAT TOILET ASSEMBLY

BACKGROUND OF THE INVENTION

This invention relates to a cat toilet assembly which functions to separate excrement from a mass of cat litter.

There are a number of apparatus designed as commodes or toilets for pets all of which are intended to permit the automatic separation of excrement from a mass of litter. All of the known designs involve somewhat complex constructions. For example, one design includes a pair of sliding trays both of which ride on rails, and a sliding plate fitted into slots formed on the inner walls of a housing. Another design incorporates an elaborate water-wash system as well as an electrically operated worm-gear arrangement for opening a door through which litter and excrement pass for separation. Yet other apparatus use a network of specially designed members to achieve automatic separation of litter and excrement. The complex nature of the heretofore known pet commode or toilet apparatus renders them expensive to manufacture and accordingly unattractively priced to potential buyers.

The present invention overcomes the above drawbacks by providing a cat toilet assembly which is very simple in structure. In its simplicity the present invention achieves an efficient automatic separation of excrement from a mass of litter without the need of anyone's special handling of the excrement except to close a container, such as a plastic bag, and discard the excrement.

SUMMARY OF THE INVENTION

The present invention provides the above mentioned advantages with a cat toilet assembly which, in its preferred form, comprises: a hollow box-like enclosure having an open top and upstanding sides; one of the sides having an intermediately located discharge passageway therethrough; a selectively operated trap door arrangement located below the top edge of the enclosure upon which would be received cat litter; a screen below the trap door, the screen being sloped downwardly where one end is arranged on the lower edge of the discharge passageway; and a removable tray beneath the screen. When it is desired to separate excrement from the litter, the trap door is opened resulting in the litter passing through the screen into the tray and the excrement sliding along the sloped screen and out of the discharge passageway. A container could be arranged outside of the discharge passageway to catch the excrement. The container could be a plastic bag hung on the enclosure outside the lower edge of the discharge passageway.

Another modification of this invention is to arrange the screen to pivot about a horizontal axis passing through the end of the screen which is connected at the discharge passageway. The opposite end of the screen is operatively connected to the trap door whereby when the door is opened the screen is disposed at one slope and then when the door is closed the screen is pivoted to a steeper slope thereby insuring complete passage of excrement through the discharge passageway.

Various advantages, details and modifications of the present invention will become apparent as the following description of a certain preferred embodiment proceeds.

DESCRIPTION OF THE DRAWINGS

In the accompanying drawings I show a certain present preferred embodiment in which:

FIG. 1 is a perspective view of a cat toilet assembly embodying the present invention, with parts cut away to show details of construction;

FIG. 2 is a side elevation view in section of a cat toilet assembly of FIG. 1 showing the trap doors thereof in a closed position;

FIG. 3 is a view similar to that of FIG. 1 showing the trap doors in an open position; and FIG. 4 is a sectional view taken along the line IV—VI of FIG. 2.

Referring now to the drawings, there is shown a cat toilet assembly 10 embodying the present invention, which assembly includes a box-like hollow enclosure or housing 12 having a generally square cross-section shape. The housing 12 has a flat base member 14 to which is secured a back wall 16, front wall 18, and side walls 20 and 22. The walls 16-22 are secured to each other at their respective vertical edges by suitable fasteners. It is to be noted that the walls 16-22 may be formed so that they are integrally secured at their sides should a plastic material, for example, be used in the construction of the housing 12. In this embodiment the housing 12 is shown constructed of wood so that nails, screws, glue, or the like would serve to fasten the walls 16-22 for forming the box-like construction.

The top of the housing 12 is opened with a trap door assembly 24 being arranged several inches below the housing's top edge. The trap door assembly 24 includes a flat, plate-like first door member 26 having its outer end pivotably connected by a pair of hinges 28, one of which is shown in FIG. 2, to an inner section of front wall 18. The inner end of the first door member 24 extends to an intermediate point between the front wall 18 and rear wall 16. A second door member 30, similarly shaped to that of first door member 26 is pivotably connected at its outer end by a pair of hinges 32 to the rear wall 16. The first and second door members 26 and 30 are arranged such that the inner end of the first door member overlaps the inner end of the second door when the doors are in a position to close the upper end of the housing 12 as shown in FIGS. 1 and 2. The first and second door members 26 and 30 pivot downwardly to open the upper sections of the housing 12, as shown in FIG. 3.

The first and second door members 26 and 30 are arranged below the upper edge of housing 12 a distance sufficient to form with the upper portion of the walls 16-22, a receptacle 34 for receiving cat litter or the like. The receptacle 34 is sufficiently sized to permit a cat to enter therein to comfortably perform its waste elimination processes.

The door members 26 and 30 are locked or secured in their closed position by means of a horizontally arranged, slideable elongated rod 36 which extends into the confine of the housing 12 through the rear wall 16 to engage a downwardly extending shoulder member 38 secured to the underside of the second door member 30. A bar 39 is secured at right angles to the inner end of the rod 38. In the locked position of the door members 26 and 30 the bar 39 will be disposed inwardly of the shoulder 38. The outer ends of the bar 39 are arranged to slide within guide slots 41 formed in side walls 20 and 22, one of which slots 41 is clearly shown in FIG. 1. When it is desired to open the door members 26 and 30, it merely is necessary to pull the rod 36 outwardly of the rear wall 16 whereby the door members will pivot downwardly to open the receptacle 34 to the inner confines of the housing 12. A flexible wire or rope 40 has one of its ends secured to a shoulder 42 fixed to the underside of the first door member 26, with the other end of the rope extending through the rear wall 16. When it is desirable to close the door members 26 and 30, the rope 40 may be pulled away from the rear wall 16 and by so doing the rope pulls up on the first door 26 while at the same time it exerts an upwardly directed force on the inner end of the second door 30 to urge it upwardly. When the door members 26 and 30 are in their fully closed position, the rod 36 is pushed inwardly to engage shoulder 38 to thereby lock the door members in place.

A flat screen member 50 is disposed within the confines of the housing 12 below the door assembly 24. The lower end of the screen member 50 is secured to the lower edge of a discharge passageway 52 formed through the front wall 18. The lower end of the screen member 50 is suitably secured to allow a pivotable movement of the screen member. The screen member 50 is arranged at an inclined angle to the longitudinal axis of the enclosure 12, with upper end of the screen member being secured to the second door member 30 through elongated flexible tie members 52. The upper end of each tie member 52 is fixed to the body of the second door member 52 while the lower end of each tie member is secured to the upper edge of the screen member 50. Disposed below the screen member 50 is a removable tray 60 which may be taken out of the enclosure 12 through an opening 62 provided through the lower end of the rear wall 16 of the enclosure 12. Arranged at the four corner areas of the discharge passageway 52 are fasteners 64 to which may be temporarily secured a container such as a plastic or paper bag 66 for receiving excrement.

When it is desired to clean excrement laden litter, the trap door members 26 and 30 are opened by sliding the rod 36 outwardly of the enclosure 12. The screen member 50 will pivot to the inclined position shown in FIG. 3. The litter will fall through the screen member 50 and into the tray 60 while the excrement will remain on the screen member and, because of the inclination of the screen member, the excrement will tend to slide or roll towards and through the discharge passageway 52 and into the bag 66. The door members 26 and 30 are then closed by pulling on rope 40. As the door members 26 and 30 are being closed the screen member 50 will be pivoted upwardly to the steeper angled inclination shown in FIGS. 1 and 2. Any excrement which might remain on the screen member 50 when it is in the lower inclination position will more than likely roll off the screen member and out the discharge passageway 50. The tray 60 containing the clean litter may then be removed from the enclosure 12 through the opening 62 and the litter returned to the receptacle 34.

It should now be clearly understood how the advantages of simplicity, efficiency, and usefulness described in the introductory portion of this specification are realized by this invention. It should also be understood by those skilled in the art that various other modifications may be within the scope of this invention. For example, sealing means may be provided around the door assembly to prevent litter from passing downwardly around the edges of the closed doors. The discharge passage area may be modified to accommodate a solid excrement receiving container such as a tray. Also, the enclosure 12 may be formed without a base member or tray removal opening, whereby a litter tray may be removed merely by lifting the entire assembly.

It is also noted that this invention avoids the need for any offensive handling of excrement other than to tie the open end of the bag 66 and to discard it. In other words, this invention does not require the user to take a screen with excrement on it and to deposit the excrement in a container or down a toilet. Also, it is to be noted that this invention may be washed simply by spraying it with water from a household hose.

While I have shown and described a certain present preferred embodiment of this invention, it is to be distinctly understood that the invention is not limited thereto, but may be otherwise embodied within the scope of the following claims.

I claim:

1. A cat toilet assembly comprising:
   a hollow enclosure having an open top and upstanding sides, at least one of said sides having an intermediately located passageway therethrough;
   selectively operable door means for completely closing the open top of said enclosure arranged below the top edge of said enclosure to define with the upper portion of the sides of the enclosure a receptacle for receiving cat litter;
   generally planar screening means in said enclosure arranged at a downwardly directed inclination below said door means and communicating with said passageway for receiving thereon a mass of litter and excrement and having openings therethrough to permit the litter alone to pass downwardly, and constructed and arranged with said enclosure to permit excrement to move in a downwardly direction under its own weight and out of said passageway;
   said screening means being operatively connected with said door means to pivot downwardly to a first angle of inclination when said door means are opened and to pivot upwardly to a second angle of inclination greater than the first angle of inclination when said door means are closed; and
   tray means removably arranged below said screening means for receiving litter which passes through said screening means.

2. A cat toilet assembly as set forth in claim 1 wherein said screening means has one end thereof disposed at the lower edge of said passageway and the other end thereof arranged along the line above and parallel to the lower edge of the passageway.

3. A cat toilet assembly as set forth in claim 1 wherein said door means include a first plate member pivotably secured to one side of said enclosure and a second plate member pivotably secured to the side opposite said one side, said plate members having their inner end sections overlapping each other when the plate members are in a position closing the open top of said enclosure.

4. A cat litter assembly as set forth in claim 1 including locking means for locking said door means in its closed position.

5. A cat litter assembly as set forth in claim 1 including securing means on the side of said enclosure having said passageway therethrough for holding a container to receive excrement passing through said passageway.

* * * * *